US007813595B2

(12) United States Patent  
Nagarajan et al.

(10) Patent No.: US 7,813,595 B2
(45) Date of Patent: *Oct. 12, 2010

(54) METHOD FOR AUTOMATED IMAGE INDEXING AND RETRIEVAL

(75) Inventors: Ramesh Nagarajan, Pittsford, NY (US); Zhigang Fan, Webster, NY (US); Shivang Patel, Bensalem, PA (US)

(73) Assignee: Xerox Corporation, Norwalk, CT (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/925,134

(22) Filed: Oct. 26, 2007

(65) Prior Publication Data

US 2008/0055669 A1 Mar. 6, 2008

Related U.S. Application Data

(63) Continuation of application No. 11/295,405, filed on Dec. 5, 2005, now Pat. No. 7,324,711.

(51) Int. Cl.
*G06K 9/54* (2006.01)
*H04N 1/40* (2006.01)

(52) U.S. Cl. ...................... 382/305; 358/462

(58) Field of Classification Search ................ 382/117, 382/180, 218, 224, 243, 257, 305, 318, 319; 704/256.4; 358/462, 474, 487, 497, 505
See application file for complete search history.

(56) References Cited

U.S. PATENT DOCUMENTS 5,212,568 A * 5/1993 Graves et al. ............... 358/474

| 5,870,725 A * | 2/1999 | Bellinger et al. ............. 705/45 |
| 5,937,084 A * | 8/1999 | Crabtree et al. ............. 382/137 |
| 6,192,165 B1 * | 2/2001 | Irons ........................ 382/306 |
| 6,427,032 B1 * | 7/2002 | Irons et al. .................. 382/306 |
| 7,478,421 B2 * | 1/2009 | Kodimer et al. ................ 726/4 |
| 2005/0190981 A1 | 9/2005 | Fan et al. |

OTHER PUBLICATIONS

U.S. Appl. No. 10/788,944, filed Feb. 26, 2004, Zhigang Fan, et al.
J. Duong, M. Côté, H. Emptoz and C. Y. Suen. *Extraction of Text Areas in Printed Document Image*,. ACM Symposium on Document Engineering, DocEng'Oi, Atlanta (USA), Nov. 9-10, 2001, pp. 157-164.
R. C. Gonzalez and R. E. Wood, *Digital Image Processing*, Addison Wesley, New York, 1992.

(Continued)

*Primary Examiner*—Abolfazl Tabatabai
(74) *Attorney, Agent, or Firm*—Pillsbury Winthrop Shaw Pittman LLP

(57) ABSTRACT

A method of indexing images contained in scanned documents, wherein said scanned documents are stored in a repository, includes: for each document to be stored in the repository, dividing the document into a plurality of sections; scanning the plurality of sections; segmenting each scanned segment according to a predetermined coding model into image segment and non-image segments; associating each of the image segments with the document; and generating an index correlating the image segments with the document. The method may further include, at the time of image recall, displaying the index of image segments in a user interface; and responsive to selection of an image segment from the index, displaying the document information associated with the image segment in the user interface.

8 Claims, 8 Drawing Sheets

OTHER PUBLICATIONS

C. E. Jacobs, A. Finkelstein and D. H. Salesin, *Fast Multiresolution Image Querying*, http://grail.cs.washington.edu/projects/query/.

P. E. Mitchell and H. Yan, *Newspaper Document Analysis featuring Connected Line Segmentation*, Proc. Intl. Conf. on Document Analysis and Recognition, ICDAR'OI, Seattle, USA.

S. Wang and T. Yagasaki, *Block Selection: A Method for Segmenting Page Image of Various Editing Styles*, In Proc: of the 3rd International Conference on Document Analysis and Recognition, Montreal, Aug. 1995, pp. 128-133.

K. Wu, E. Otoo and A. Shoshani, *Optimizing Connected Component Labeling Algorithms*, Medical Imaging 2005: Physiology, Function, and Structure from Medical Images, vol. 5747, pp. 1965-1976.

Q. Yuan and C.L. Tan, *Page segmentation and text extraction from gray scale images in microfilm format*, SPIE Document Recognition and Retrieval VIII, Jan. 24-25, 2001, San Jose, California, pp. 323-332.

\* cited by examiner

METHOD FOR AUTOMATED IMAGE INDEXING AND RETRIEVAL

CROSS REFERENCE TO RELATED APPLICATIONS

This application is a continuation application of co-assigned, co-pending application Ser. No. 11/295,405 filed Dec. 5, 2005, to Nagarajan et al. for "Method For Automated Image Indexing and Retrieval," which is a continuation-in-part application of co-assigned, co-pending U.S. application Ser. No. 10/788,944 filed Feb. 26, 2004 to Fan et al. for "System for Recording Image Data From a Set of Sheets Having Similar Graphic Elements".

TECHNICAL FIELD

The present disclosure relates to the scanning of hard-copy sheets and recording of image data thereon, as would be found, for instance, in the context of digital copiers and to methods for indexing and retrieving scanned images and image segments.

BACKGROUND

The use of digital input scanners, which can successively scan a set of sheets and record the images thereon as digital data, is becoming common in the office context, such as in digital copiers and electronic archiving. In any situation in which digital image data is created and accumulated in memory and/or transmitted through communication channels, it is desirable that the memory and the communication bandwidth are used in an efficient way. In particular, it would be good to avoid filling up the memory and the communication channels with redundant data.

A common type of input scanning in an office context is scanning and recording images from forms, slide presentations, or other documents in which multiple page images share a common "template" or appearance cues, such as logos, letterheads, PowerPoint templates and so forth. In a typical slide presentation, there is a standard template slide design, including for instance a logo and a border. Among the slides only the text changes in some slides, and in other slides the interior may include a graphic, table or spread sheet. The present embodiment is directed toward a technique for efficiently recording such documents in memory with image indexes for easier retrieval later.

In an office environment, image store and recall is becoming increasingly important feature where in scanned documents are stored in the multifunction device's storage disk for later retrieval. This allows multiple users to store their jobs in the Multifunction Devices (MFD), which can be retrieved later either by themselves or by other users. As more paper documents become digitized and stored, the ability to search through them by content has become very important. Optical character recognition (OCR) has had many advances over the years, making searching for a string of text simpler and more accurate. But there is a growing need for having image-based searching and retrieval techniques in today's multifunction devices. Many times searching by text is not enough, most of the documents stored in a MFD are usually in image format, and a system to provide a condensed list of documents possibly containing same image is needed.

It would be desirable to have a method of indexing stored documents and images that would facilitate easy retrieval at a later time.

PRIOR ART

The MPEG standard includes steps of comparing images in a series of frames, to detect visual objects, which are persistent over the series of frames.

SUMMARY

There is provided a method of recording an input image as digital data, comprising determining input bounding boxes corresponding to objects in the input image, and comparing data describing the input bounding boxes to data describing a set of reference bounding boxes. For an input bounding box sufficiently similar to a reference bounding box, objects are compared in the input bounding box and the reference bounding box. If the object in the input bounding box is sufficiently similar to the object in the reference bounding box, the object in the input bounding box is coded using a pointer to the object in the reference bounding box.

There is provided, in another embodiment, a method of indexing images contained in scanned documents, wherein the scanned documents are stored in a repository, comprising: for each document to be stored in the repository, dividing the document into a plurality of sections; scanning the plurality of sections; segmenting each scanned segment according to a predetermined coding model into image segment and non-image segments; associating each of the image segments with the document; and generating an index correlating the image segments with the document. The method may further include, at the time of image recall, displaying the index of image segments in a user interface; and responsive to selection of an image segment from the index, displaying the document information associated with the image segment in the user interface.

In this embodiment, a section may be either a background windows or a binary mask layer according the multiple binary mask with multiple background window (MBM&MBW) model. Prior to segmenting, any uniform background windows, which would typically include only a small number of bytes, would be excluded. The index of images may be limited to include only inter-correlated regions in the background layer of the input document and the background layer of the reference document. For a multi-page document, for each image segment occurring on a page may be associated with the page number and with a thumbnail image of the page. If a user wishes to find all of the documents having a particular image segment, a search engine may be used to search for a selected image segment among the index of image segments by comparing the image data for the particular image segment with image data for each of the image segments in the index.

There is a provided in another embodiment a method of indexing images contained in scanned documents, wherein said scanned documents are stored in a repository, comprising: for each document to be stored in the repository, scanning the document to obtain a grayscale image; determining at least one region of interest in the grayscale image; determining predetermined statistical characteristics of the at least one region of interest; based on the statistical characteristics of the at least one region of interest, classifying the at least one region of interest as either text or non-text; associating each of the non-text regions of interest with the document; and generating an index correlating the non-text regions of interest with the document. The statistical characteristics may comprise aspect ratio, average hue and average saturation. Determining predetermined statistical characteristics of the at least one region of interest may comprise determining a horizontal projection histogram. The method may further include displaying the index of non-text regions of interest in a user interface; and responsive to selection of a non-text region of interest from the index, displaying the document information associated with the non-text region of interest in the user interface. The method may also be used to search for all documents having a selected non-text region of interest by comparing data describing the region of interest's aspect ratio, average hue and average saturation to data describing a set of reference images aspect ratio, average hue and average saturation; if the data describing the region of interest's aspect ratio, average hue and average saturation is sufficiently similar to the data describing a reference image, displaying the document information associated with reference image in the user interface.

In this method, scanned documents stored in a storage device are segmented into non-text regions ("blobs") for indexing and retrieval at a later stage. After extracting the non-text areas of a document, statistical metrics are computed for each region of interest or blob. After scanning the jobs in the disk, "blobs" are identified and their metrics are stored as indices to the document. These "indices" could be used later to perform searching and retrieval of all related documents upon request by the user. The statistical metrics method is an alternative to the predictive coding method that uses sophisticated MRC segmentation and correlation algorithms to identify the indices.

A method of retrieving a scanned document stored in a repository, comprises displaying a preview of a plurality of index images and each document name associated with each index image in a user interface, wherein each index image occurs at least once in each of its corresponding documents; displaying along with the index images and document name, the document type, and the user associated with each of the documents; responsive to user selection of at least one index image displayed in the user interface, retrieving all documents associated with the selected index image. The method may be configured so that only authorized documents, based on user authentication, are displayed in the user interface.

DETAILED DESCRIPTION

Figure 1:
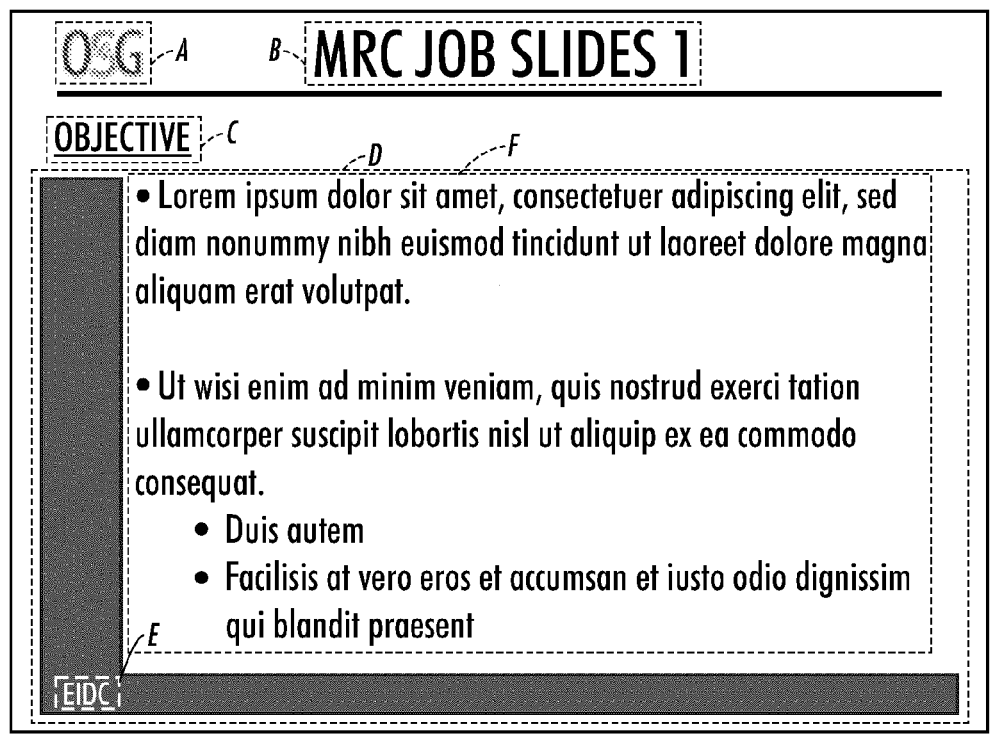
FIGS. 1 and 2 show example images to illustrate the overall operation of the embodiment.
Figure 2:
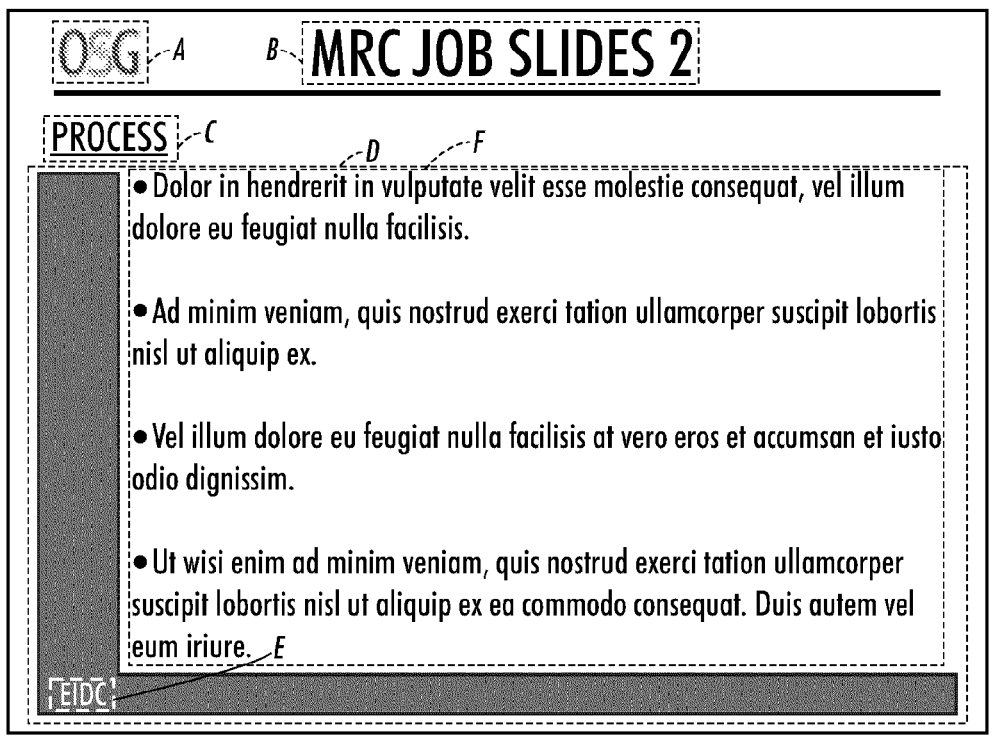

FIGS. 1 and 2 show example images to illustrate the overall operation of one embodiment. The Figures show two generally similar page images as would typically appear, for instance, as separate slides in a slide presentation. As can be seen, the slides (FIGS. 1 and 2) differ in some details, such as the text, but include numerous graphical similarities, such in a logo and border, as well as some common text blocks. Superimposed on each slide, for purposes of the present discussion, are a number of "bounding boxes," here labeled A-F, of a general type known in image processing to isolate smaller images of a single identifiable type, called objects, within a large image. In this embodiment, a bounding box is the smallest possible rectangle (having dimensions along the x and y directions of the large image) that encompasses an object. The number of objects found in an image may vary depending on a particular segmenting technique.

Comparing the images of FIG. 1 and FIG. 2, it can be seen that many of the bounding boxes of the objects are substantially similar in terms of location, dimensions, color, type (such as text, halftone image, photograph, etc.) and other features (such as color uniformity, black/white or color). Although the general configurations of bounding boxes A-F are identical in the two Figures, the actual images within each bounding box are identical only in bounding boxes A and E, but differ within bounding boxes B, C, D, and F. Nonetheless, the fact the dimensions and types of bounding boxes in the two images are identical (or, in a practical sense, "sufficiently similar") is highly indicative that the two images share a common "template." The fact the two images in FIG. 1 and FIG. 2 are generally similar presents an opportunity to save memory, bandwidth and other resources when processing the images for any purpose, such as printing or archiving. The present embodiment identifies and exploits such opportunities.

Figure 3:
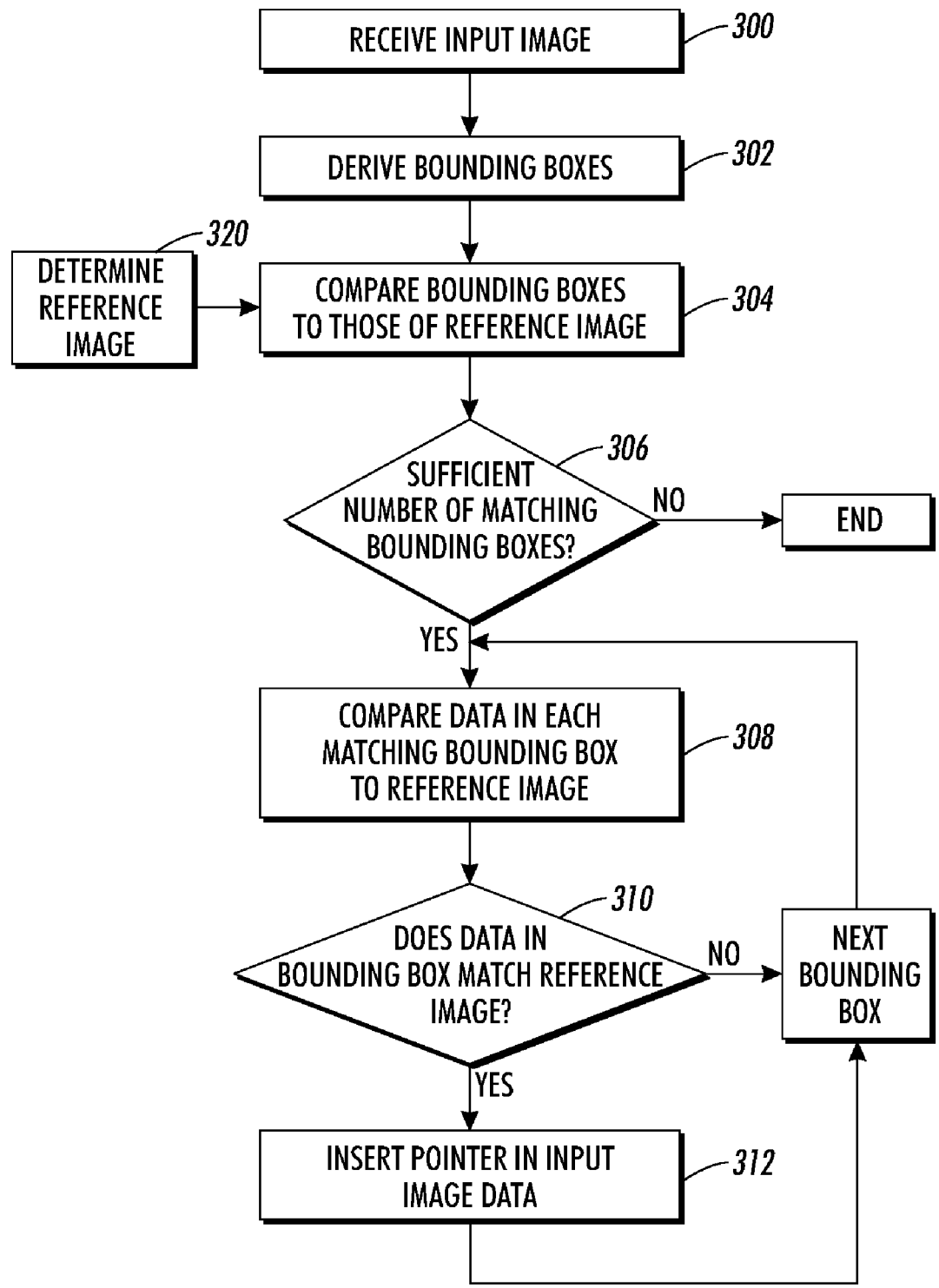
FIG. 3 is a simplified flow chart illustrating the basic steps by which two images can be compared.

FIG. 3 is a simplified flowchart illustrating the basic steps by which two images can be compared; in this embodiment, an "input image" is compared to a predetermined and preprocessed "reference image," but, as will be described in detail below, the "reference image" data can be obtained in various ways. At step 300, the data from the input image is received, such as through a digital input scanner as part of a digital copier, and suitably processed, such as by being segmented, analyzed, and converted to a known MRC (Mixed Raster Content) or other format. As part of this analysis, a set of bounding boxes are determined around identified objects in the input image data through algorithms generally familiar in the art (step 302). The resulting bounding boxes and the objects therein are then compared to bounding box data related to the reference image (step 304). The bounding boxes are compared by attributes such as dimensions, location, image type (such as text, halftone image, photograph, etc.) and other features (such as color uniformity, black/white or color), which is a straightforward matter under many MRC image formats, as will be described in detail below.

If the number of matching (i.e., sufficiently similar) bounding boxes exceeds a threshold number (step 306), then it can reasonably be determined that the input image and the reference image share a common template, such as the images of FIG. 1 and FIG. 2. In a practical application, determining that two bounding boxes are "sufficiently similar" is a matter of selecting tolerances for box dimensions, location, type, feature, etc., that will take into account sources of image noise and distortion such as skew. Once this general similarity is determined by comparison of the bounding box data, the actual image data, or objects, within corresponding bounding boxes in the input and reference images are compared (step 308). If the data in the two boxes are sufficiently similar, taking into account tolerances for various types of noise and distortion (step 310), then it can be determined that the bounding box in question within the input image can be substituted with image data from the reference image; in such a case a pointer is placed within the input image data instead of image data directly describing the image in the bounding box (step 312). If a match is not determined, then the original input image data is used.

Office documents usually contain various components such as text, graphics and pictures. They are often segmented using Mixed Raster Content (MRC) models before compression. In MRC, an image is decomposed into a few layers. Each layer is designed to carry either smooth varying information or edge information. There are many different variations of MRC models. The method of indexing images contained in scanned documents embodiment employs, for exemplary purposes only, a multiple binary mask with multiple background window (MBM&MBW) model. In MBM&MBW, the image is segmented into a background layer and a few binary mask layers. The binary mask layers represent text (and other details) of uniform color. In addition to a binary bitmap describing the text shapes, a binary layer also has "additional information" specifying the color of the texts and the location of the mask. The background layer represents anything that is not covered by the binary layers, including pictures and non-uniform text (and other details). The background may be decomposed into several non-overlapping windows. If a window is uniform in color and has a simple shape, it may be specified with just a few parameters (referred to as a "uniform window"). More commonly, a window is associated with a color or grayscale bitmap, together with the information that specifies the location of the window.

With regard to step 302 in detail, in one practical application, a multiple binary mask with multiple background windows (MBM&MBW) model is useful for obtaining bounding box information. In MBM&MBW, the image is segmented into a background layer and a few binary mask layers. The binary mask layers represent text (and other details) of uniform color. In addition to a binary bitmap describing the text shapes, a binary layer also has information specifying the color of the texts and the location of the mask. The background layer represents anything that is not covered by the binary layers, including pictures and non-uniform text and other details. The background may be decomposed into several non-overlapping windows. If a window is uniform in color and has a simple shape, it may be specified with just a few parameters (a "uniform window"). More commonly, a window is associated with a color or grayscale bitmap, together with the information that specifies the location of the window. In a practical embodiment, the predictive coding is performed section by section for the input image, where a section could be a non-uniform background window, or a binary mask layer. Uniform background windows are typically excluded from analysis, as they typically contain only a small amount of bytes and prediction does not provide noticeable overall gain. However, if for some reason the prediction is desirable for the uniform windows, the procedure can be performed following the same principle as described for binary mask layers and background windows (or image objects).

With regard to steps 308 and 310 in detail, where the image data within corresponding bounding boxes are compared, the two bitmaps (images in bounding boxes to be compared) are first aligned. Specifically, the relative translations and rotations between the input and the reference bitmaps are estimated. The relative rotation is typically small and negligible, and can be estimated. The shift parameters can be derived using the results calculated from the steps of matching corresponding bounding boxes, or using any other standard methods. The input image bitmap is then divided into disjoint square blocks, with a typical block size of 16×16 to 64×64 pixels. The blocks are matched to the corresponding blocks in the reference image bitmaps. Many standard matching methods and error criteria can be used here. In one practical embodiment, the matching is performed at a lowered resolution, such as with sub-sampling for binary masks, and smoothing followed by sub-sampling for background windows. This not only reduces computation, but also enhances the robustness to noise for background windows. In addition to the global translations between the two bitmaps, each block might be shifted slightly differently; to compensate for the relative local shifts; the matching may be performed using several slightly different translation parameters. For each pair of corresponding bounding boxes, the matching is successful, i.e., the images are sufficiently similar, if the matching error is below a threshold. For each pair of corresponding images in the reference and input images, the compared images ("sections") are determined to be either "predictable" (identical within a certain tolerance) or unpredictable. A section of the input image that is unpredictable is coded normally, without prediction.

In a practical embodiment of step 312, pointers are inserted into the input image data relating to the reference image data for each pair of corresponding images in the reference and input images that are predictable. An instruction is set forth relating to how the prediction is conducted. The instruction includes a pointer to the reference section and a bounding box indicating which portion of the reference bitmap is used in prediction. The instruction also gives the relative position of the input bitmap and the reference bitmap; this information is required if some blocks failed in the steps 308, 310. As these blocks cannot be well predicted, the input information for these blocks needs to be transmitted as "correction images."

The basic method set forth in FIG. 3 relates to a general case in which a recently obtained "input image" is compared to a pre-existing "reference image." In a practical situation, such as in a digital copier or a network printing and copying system, the reference image must be somehow obtained in advance. Many approaches can be taken to obtain the reference image, or more broadly determine data describing a set of reference bounding boxes, as summarized at step 320 in FIG. 3. In a basic case, such as when a user of a digital copier is scanning in what is known to be set of slides with a uniform template, the user can indicate to the scanning system through a user interface that the first-scanned page image in the set should serve as the reference image in regard to subsequent page images in the set. A variation of this idea would be to have the user cause the scanning system to enter a special "training mode" in which a plurality of sheets believed to have a common "template" are scanned in and analyzed, basically by using an algorithm to find objects common to all of the sheets, taking into account certain types of noise such as skew and color variances (indeed, the detected variances in the training mode can be used to derive tolerances in the various matching steps). From this training mode a basic template of common objects can be derived, and this basic template can be used to determine the reference image data.

Figure 4:
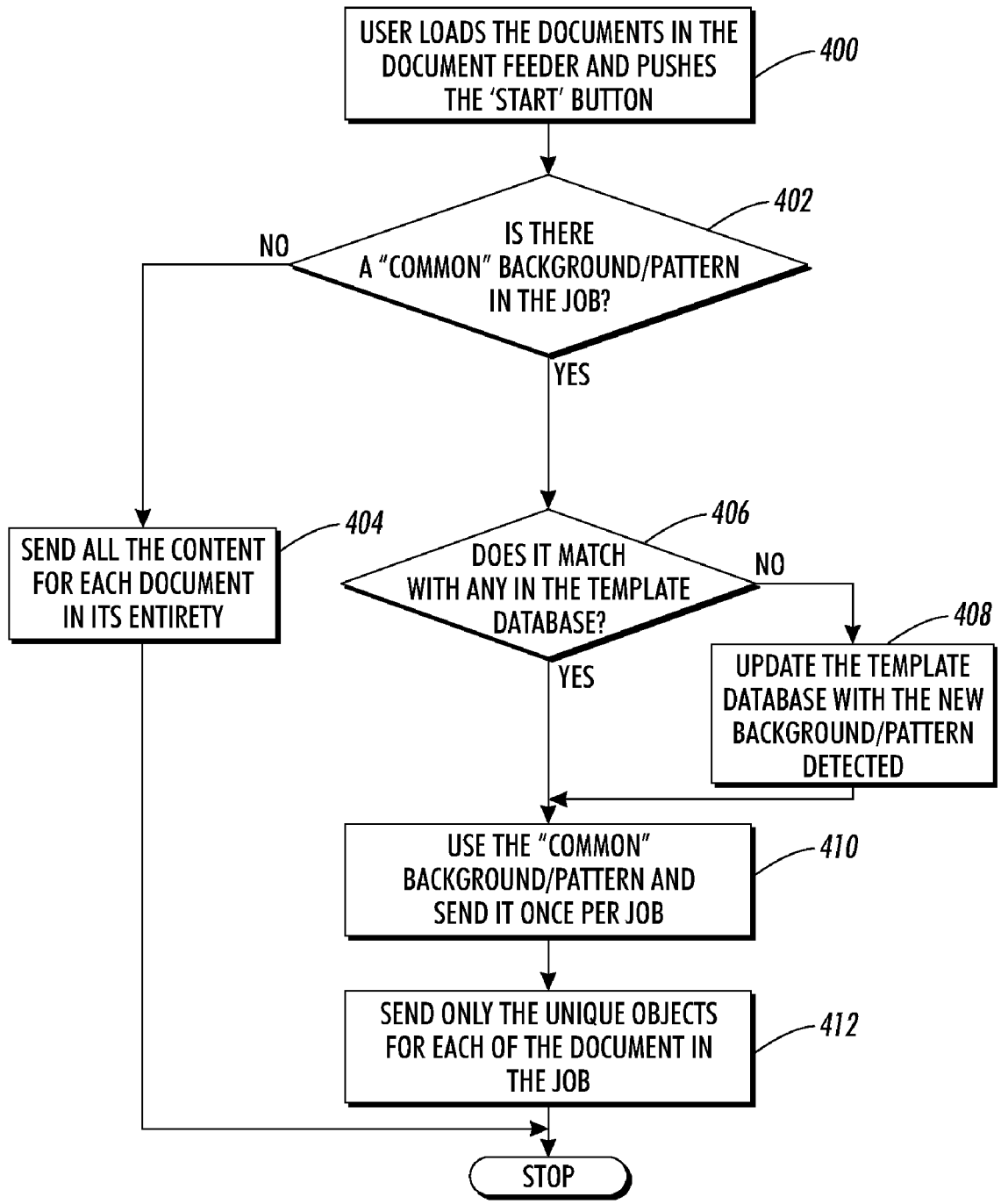
FIG. 4 shows a flow chart for a method, which could be associated with a digital copier or scanner.

Another strategy for obtaining a suitable reference image includes maintaining a database of commonly used image templates, which can be practical in the context of a large company with an established logo or style. A number of possible reference images are maintained in the database, and more can be added as desired or as detected by automatic software for such a purpose. FIG. 4 shows a flow chart for a method, which could be associated with a digital copier or scanner, which exploits a database of possible reference images. At step 400, the original hard-copy documents are loaded and scanned. At step 402 the data based on the input page images is previewed, such as through low-resolution analysis, to find any recurring objects in the plurality of images. If no such recurring objects are found, the data is sent to downstream systems as a regular scan or copy job (step 404). If a recurring set of objects is found (step 402), the image data (which could be low-resolution data) is compared to each of a series of template images in the database. If the image data does not match any of the templates in the database (step 406), data related to the recurring image can be retained as a new template in the database (step 408). Then a "best fit" template from the database can be used as the reference image, and the steps of FIG. 3 are followed; in which case the common aspects of the template image are used for every scanned page image (step 410) with only the data which varies among the page images sent in a normal manner to downstream systems (step 412). By using the database approach, the system can maintain a collection of templates for a given customer site and by averaging over a bigger sample, and the database will contain accurate representations of the templates.

The foregoing embodiment exploits the correlations among the pages in a scanned multiple-page document and describes a predictive coding method to identify the image regions that are common between pages. In an input scanning system, such as in a digital copier, a "template" of similar visual elements or objects, such as logos and other designs, is detected among a series of scanned images. The common objects form a reference image against which subsequently recorded input images are compared. If bounding boxes around objects in the input images match those in the reference image, the objects in the bounding boxes are attempted to be matched to those in the reference image. If objects in the input image and reference image match, then the image data from the input image is coded using a pointer to a corresponding object in the reference image.

In accordance with another embodiment, the coding method described above, which identifies image regions that are inter-correlated between pages, can be used to generate an image "index" of individual scanned images from the scanned document/job. The index can be used by a user to find a previously scanned document. In the foregoing method of recording an input image as digital data, images stored in any storage device are segmented into image regions for easier indexing and retrieval at a later stage. At the time of scanning images in a job, a predictive correlation method such as inter-page correlation is used to determine a few parameters, which will be used as "index" images. These "index" images may be used later to perform searching and retrieval of all related documents upon request by the user. Alternatively, if performing an extensive search, the "index" for retrieval could be each of the objects identified in the scanned documents. The image to be used as an index into the stored documents may be referred to as the "index image" and the stored images used for a search may be referred to as "reference images".

A method of indexing and retrieving a document through the use of images contained in the documents includes the following steps. During the image store process, all the images are segmented using an MBM&MBW model. Then, predictive coding is performed section by section initially while scanning the image, where a section could be a (non-uniform) background window, or a binary mask layer. Uniform background windows may be excluded here, as they typically contain only a small amount of bytes and prediction does not provide noticeable overall gain. However, if for some reason the prediction is desirable for the uniform windows, the procedure can be performed following the same principle as described for binary mask layers and background windows.

Using the predictive coding method, the "index" images are defined to be the inter-correlated regions in the background layer. Alternatively, if extensive search is to be performed for some applications, the entire background layer objects may be identified as "index" images. These identified "index" images are then stored in the disk. Information pertaining to the document from which the index image originates is associated with each index image. Other information may be associated with the index image, for example, type of image (e.g., logo, photograph, graphic, bar graph, data plot, etc.), size of image, color of image, which page or pages the image occurs, etc. A single index image may be associated with a document; alternatively, multiple index images may be associated with the document. Further, an image of each page of a document may also be stored in the index.

Figure 5:
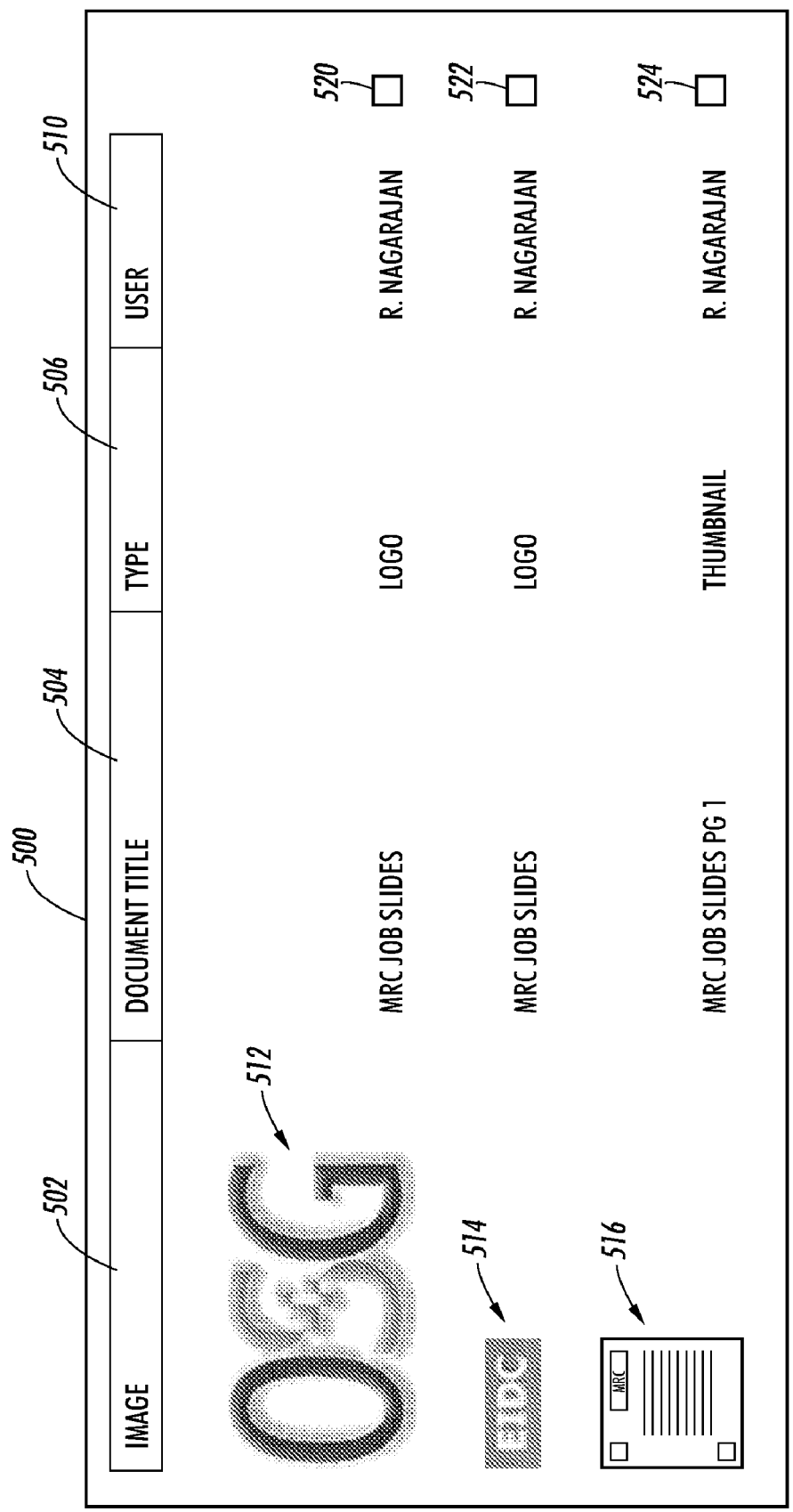
FIG. 5 illustrates a user interface displaying an image index according to another embodiment.

At the time of Image recall, the user is presented with a preview of the "index" images. The user can then easily select the appropriate image or the associated job. Referring to FIG. 5, the image index may be displayed in a user interface 500. User interface 500 displays a column 500 of index images 512, 514, 516. Document title 504, type 506 and user 510 are also displayed for each index image. For example, image 512 is associated with document title(s) "MRC Job Slides". It may be noted that a single index may point to more than one document in the database. Image 512's type is "logo" and the user associated with this document is "R. Nagarajan". If the user selects button 520, more information will be displayed about "MRC Job Slides". Alternatively, button 520 can be configured such that when selected by a user, the identified image and/or the associated job are retrieved for printing and sending it to the network. Image 514 is also listed as a type "logo" whereas image 516 is a thumbnail image of the first page of "MRC Job Slides". The various columns may be sorted according to, for example, "Type". User interface 500 may be configured to display only a single "index image" for each document. Alternatively, as shown in FIG. 5, the user interface 500 is configured to display all "reference images", i.e., all images found using the predictive coding algorithm. User interface 500 may be configured to display all the "index images" in the database. Alternatively, the user interface 500 can be also configured to display only those "index images" that correspond to the user that is currently logged on. Based on user authentication, only authorized documents and corresponding "index images" may be displayed during a search.

If the user interface is short on space, the user may be presented with a preview of a small number of index images. The user can select a single index image and then a search engine is used to search the database of reference images for an image similar to the selected index image based on characteristics of the index image itself. Predictive coding can be used to compare the selected image with the reference images in order to obtain a match. The method analyzes color schematics, contours, and patterns as "data" to search more than 10,000 reference images at once. The indexing can be either performed on a job-by-job basis or on an image-by-image basis, if necessary. The trade-off is between indexing storage space requirement and the accuracy, robustness, and extensiveness of the search algorithm. If a match is obtained, the identified image and/or the associated job may be retrieved for printing and sending to a network.

Alternative to the embodiment described above, where the page segmentation is performed in MRC model, other methods may be applied here to segment the documents into regions of interest and identify these regions as either text or non-text (image). Many techniques exist for doing this in the field of document analysis and page segmentation. Most of these techniques can be classified into the following three groups: top-down (or model driven), bottom-up (or data driven) and hybrid. With top-down techniques, segmentation is performed by breaking large components of a document into smaller components. Top-down techniques are often fast but a priori knowledge about the document and its general layout are needed. Bottom-up techniques work by taking smaller components and merging them together into larger structures. Hybrid approaches combine techniques of both top-down and bottom-up approaches.

In accordance with another embodiment, scanned documents stored in a storage device are segmented into non-text regions ("blobs") for indexing and retrieval at a later stage. For segmentation of text vs. non-text areas we rely on the fact that text regions tend to have the following characteristics: text areas possess certain frequency and orientation information; and text areas show spatial cohesion—text from the same string tends to have similar size, orientation and spacing.

Figure 6:
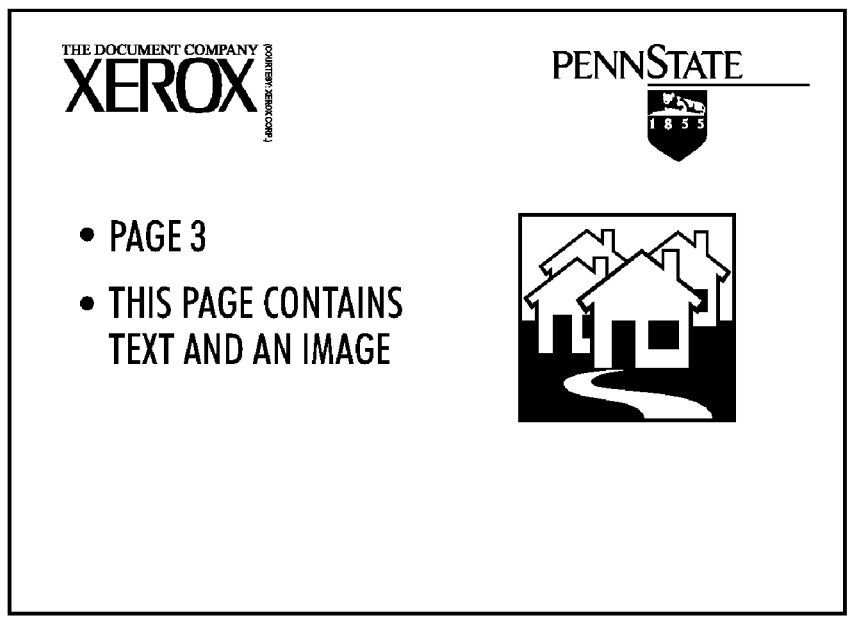
FIG. 6 illustrates a PowerPoint document with both text and graphical logos.
Figure 7:
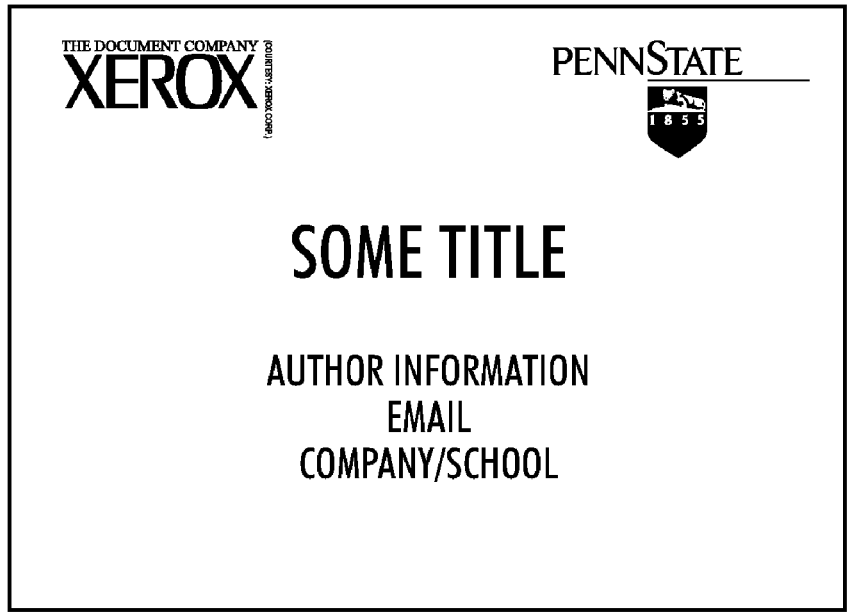
FIG. 7 illustrates a PowerPoint document with text and graphics.

FIGS. 6 and 7 illustrate two PowerPoint slides from which images will be extracted using the statistical method. The extraction process begins by computing the gradient matrix ($\nabla f$) of the grayscale image. The gradient at each pixel can be described as follows:

$$\nabla f = \begin{bmatrix} G_x \\ G_y \end{bmatrix} = \begin{bmatrix} \partial f / \partial x \\ \partial f / \partial y \end{bmatrix}$$

$$\nabla f = mag(\nabla f) = \sqrt{(G_x^2 + G_y^2)} \approx |G_x| + |G_y|$$

where $G_x$ and $G_y$ are the Sobel gradient operators:

$$\begin{array}{ccc} -1 & 2 & -1 \\ 0 & 0 & 0 \\ 1 & 2 & 1 \end{array} \qquad \begin{array}{ccc} -1 & 0 & 1 \\ -2 & 0 & 2 \\ -1 & 0 & 1 \end{array}$$

Figure 8:
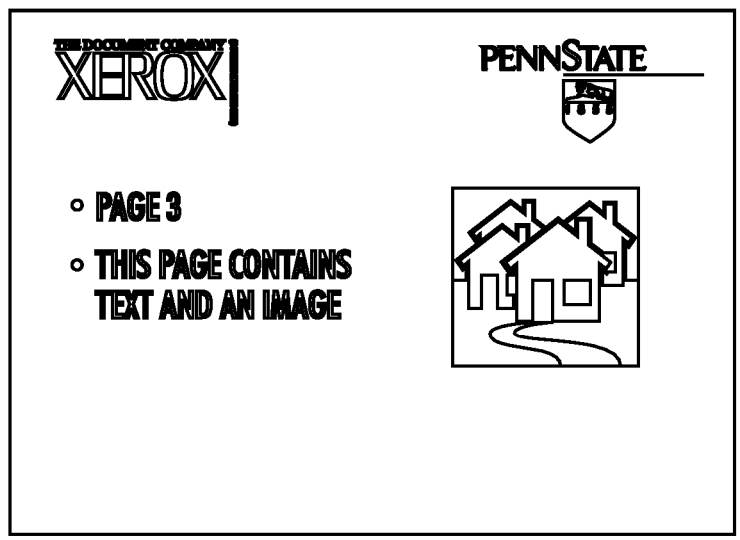
FIG. 8 illustrates extracted regions from FIG. 6.
Figure 9:
FIG. 9 illustrates an example of an extracted text region.
Figure 10:
FIG. 10 is an example of an extracted image region.

Once $\nabla f$ has been computed, a binary image, $I\nabla f$ is constructed by thresholding those pixels whose gradient value are greater then some value T, which for convenience in this method is defined as a value of 150. Once the gradient image, $I(\nabla f)$ of the image has been computed, the cumulative gradient matrix, S, and its corresponding image, IS, is computed. This is done to connect regions that are of close proximity to each other, such as characters in a word. The cumulative gradient matrix is described as follows (see J. Duong, M. Coté, H. Emptoz, C. Suen. Extraction *of Text Areas in Printed Document Images*. ACM Symposium on Document Engineering, DocEng'Oi, Atlanta (USA), Nov. 9-10, 2001, pp. 157-165.):

$$S(i, j) = \sum_{k=j-\frac{w}{2}}^{k=j+\frac{w}{2}} |\nabla f(i, k)|$$

Where w is the segment length parameter. For an exemplary system, a value of width/150 is used. A binary image, $I_S$ is generated by setting all pixels to one, whose corresponding cumulative gradient value is non-zero. $I_S$ is then dilated with a 7×7 structuring element; this is also done to connect regions that are of close proximity. Finally a connected component labeling algorithm is performed. In this system an array based union-find algorithm is used as described in K. Wu, E. Otoo and A. Shoshani, *Optimizing Connected Component Labeling Algorithms*, Medical Imaging 2005: Physiology, Function, and Structure from Medical Images, Volume 5747, pp. 1965-1976. FIGS. 6 and 7 show examples of two input documents that have a few "common" blobs of interest. FIG. 8 shows the resultant connected components image of the original PowerPoint slide shown in FIG. 6. FIGS. 9 and 10 show some examples of extracted text and image portions of the original PowerPoint document.

Figure 11:
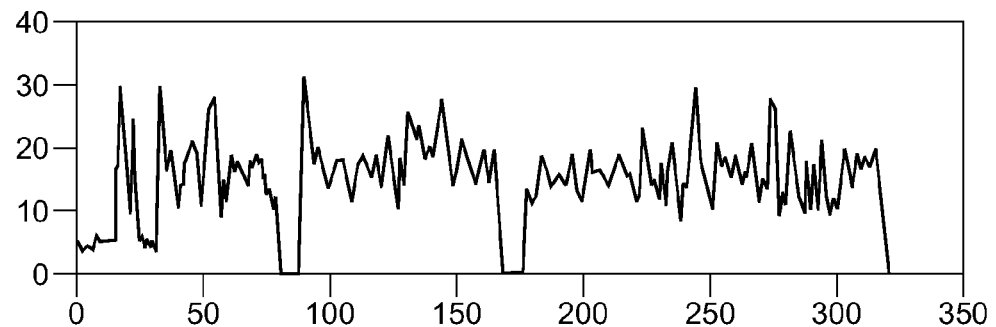
FIG. 11 is a horizontal projection histogram of a text region.
Figure 12:
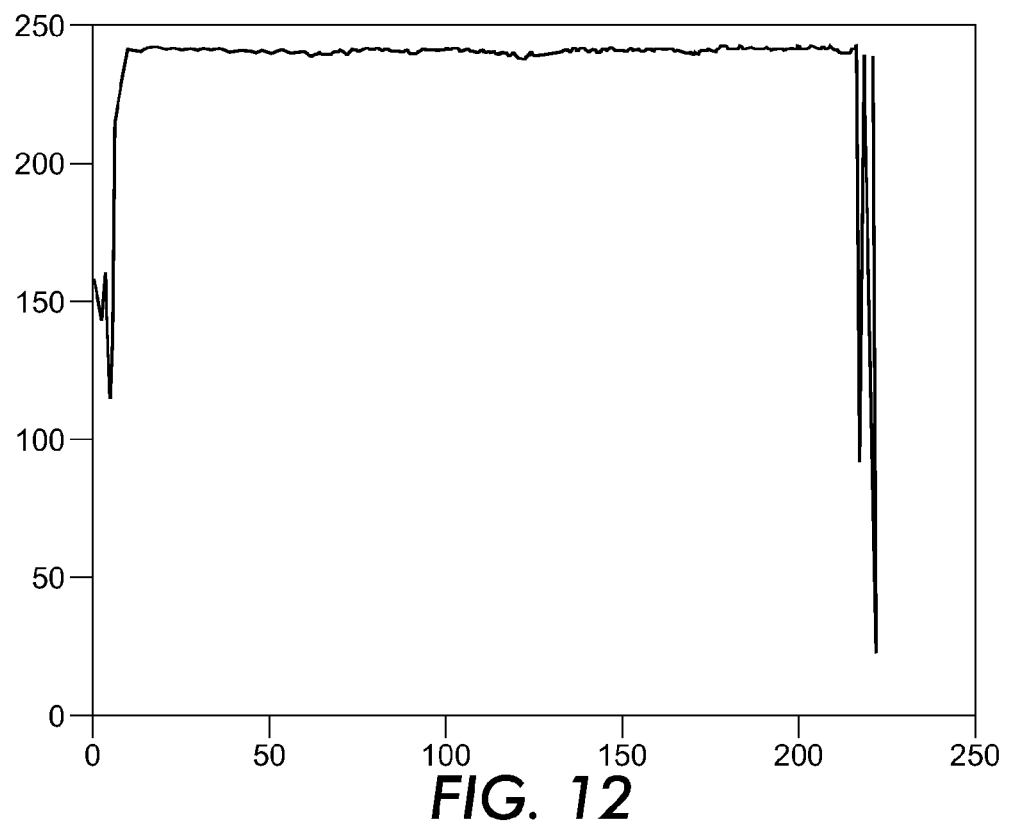
FIG. 12 is a horizontal projection histogram of an image region.

Once each region is extracted it must be classified. Many techniques exist to categorize areas of a document into specific labels based on a set of predefined rules. See for example: S. Wang and T. Yagasaki, *Block Selection: A Method for Segmenting Page Image of Various Editing Styles*, In Proc. of the 3rd International Conference on Document Analysis and Recognition, pages 128-133, Montreal, August 1995 and P. Mitchell and H. Yan, *Newspaper Document Analysis featuring Connected Line Segmentation*, Proc. Intl. Conf. on Document Analysis and Recognition, ICDAR'01, Seattle, USA. Only two categories are of interest, text versus non-text (which include images, graphs, figures, logos, headings, etc.). Text regions are identified by its textural properties as described in J. Duong, M. Coté, H. Emptoz and C. Suen. *Extraction of Text Areas in Printed Document Images*, ACM Symposium on Document Engineering, DocEng'Oi, Atlanta (USA), Nov. 9-10, 2001, pp. 157-165 and Q. Yuan and C. L. Tan, *Page segmentation and text extraction from gray scale images in microfilm format*, SPIE Document Recognition and Retrieval VIII, 24-25 Jan. 2001, San Jose, Calif. pp. 323-332. For each region, C, a horizontal projection histogram Hp(c) is computed. FIGS. 11 and 12 show the horizontal projection of the extracted regions shown in FIGS. 9 and 10, respectively. As it can be seen in FIG. 11, the histogram of the text blob (FIG. 9) contains a large amount of variation while the histogram in FIG. 12 of image blob (FIG. 10) is relatively flat. Hp(c) is normalized and the entropy, Ec for region C is computed as follows:

$$E = -\sum_{i \in I_{P(C)}} pi \ln(pi)$$

where $I_{P(C)}$ is the index of Hp(c) and $$pi = \frac{H_{P(C)}[i]}{\sum_{k \in I_{P(C)}} H_{P(C)}[k]}$$

As mentioned in J. Duong, M. Coté, H. Emptoz and C. Suen. *Extraction of Text Areas in Printed Document Image*, ACM Symposium on Document Engineering, DocEng'Oi, Atlanta (USA), Nov. 9-10, 2001, pp. 157-165, the entropy is a measure of the homogeneity of a histogram. A flat histogram will have larger entropy than a histogram with a large amount of variation. Using the calculated entropy value, region C can now be classified as either text or non-text. In one implementation those regions whose entropy is below a certain value $E_T$ are discarded, other regions are extracted and statistical metrics are calculated for the remaining extracted regions as described below.

Currently the aspect ratio, average hue and average saturation of each non-text blob are computed for comparison. These metrics are some of the global methods used for describing each blob and can be useful in condensing the number of possible matches when searching for similar "blobs". Alternatively, for narrowing down the search even further, a wavelet-based metric can also be used to compare images; this metric is based on the work in C. Jacobs, A. Finkelstein and D. Sales in *Fast Multiresolution Image Querying*, http://grail.cs.washington.edu/projects/query/. The main idea behind this metric is to find the n maximum wavelet coefficients, both positive and negative, and comparing their location in the stored blob vs. the querying blob. In an exemplary system twenty positive and twenty negative coefficients are collected. The metric can be summarized as:

$$w_0|Q(0,0) - T(0,0)| - \sum_{i,j:\tilde{Q}[i,j]=0} w_{bin}(i,j)(\tilde{Q}[i,j] = \tilde{T}[i,j])$$

where Q and T are the single color channel wavelet decomposition and Q[0,0] and T[0,0] are the scaling function coefficient corresponding to the overall average intensity of the color channel. $\tilde{Q}$ and $\tilde{T}$ are the [i,j]-th truncated quantized wavelet coefficients, which will have a value of −1, 0, or +1, and $w_{i,j}$ are a small number of experimentally determined weights.

Table 1 shows a comparison of the metrics: aspect ratio, average hue, and average saturation for some of the extracted blobs. The extracted images (or "blobs") used are shown in FIGS. 13-15 and FIG. 16 is the reference "blob" that is being compared against. The results show that with these simple metrics one can at least reduce, and narrow down the number of document matches very quickly.

TABLE 1

Comparison of aspect ratio, average hue and saturation

Xerox Logo

| | |
|---|---|
| Aspect Ratio | 1.784483 |
| Average Hue | 0.440591 |
| Average Saturation | 0.110326 |

PSU Logo

| | |
|---|---|
| Aspect Ratio | 2.223140 |
| Average Hue | 0.237457 |
| Average Saturation | 0.051151 |

"Some" text

| | |
|---|---|
| Aspect Ratio | 3.276596 |
| Average Hue | 0.432884 |
| Average Saturation | 0/068164 |

A second set of results corresponds to the wavelet-based metric, which helps in further narrowing down the search. Table 2 shows the results of running the wavelet statistical metric on various images. FIGS. 13, 14, 15, and 10 (the extracted blobs) are scored against FIG. 16 (reference blob). The lower the score the more likely to be a match. It should be noted that the size of the stored blob and the size of the comparison blob should be the same size. This is because of the way the metric works and how it is based on comparing locations of the largest coefficients.

TABLE 2

Wavelet based metric results, lower values correspond to closer matches

Figure 13:
FIG. 13 is the extracted Penn State logo from the slide of FIG. 6.
Figure 14:
FIG. 14 is the extracted text "Some" from the slide of FIG. 6.
Figure 15:
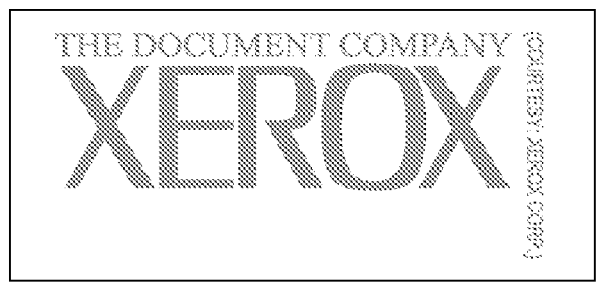
FIG. 15 is the extracted Xerox logo from the slide of FIG. 6.
Figure 16:
FIG. 16 is a reference "blob".

| | |
|---|---|
| FIG. 6 - scan - Xerox | |
| FIG. 13 | 14.9894 |
| FIG. 15 | 0.2620 |
| FIG. 10 | 156.4554 |
| FIG. 14 | 175.8898 |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of retrieving a scanned document stored in a repository, comprising:
   displaying in a user interface a preview of a plurality of index images and each name of the document from which each index image originates, wherein each index image represents image regions in multiple documents or between pages of a single document, and each index image occurs at least once in each of its corresponding documents;
   displaying along with each of the index images and the document names, a document type, and a user associated with each of the documents; and
   responsive to user selection of at least one index image displayed in the user interface, retrieving all documents associated with the selected index image.

2. The method of claim 1, wherein only authorized documents, based on user authentication, are displayed in the user interface.

3. The method of claim 1, wherein for each displayed document, all associated documents are displayed in the user interface.

4. The method of claim 1, wherein upon selection of the at least one index image, all associated documents are printed on an output device.

5. The method of claim 1, wherein upon selection of the at least one index image, all associated documents are sent over a network to a user desired location.

6. The method of claim 1, wherein upon selection of the at least one index image, all associated documents are displayed in the user interface.

7. A method of retrieving a scanned document stored in a repository, comprising:
   displaying in a user interface a preview of a plurality of index images and each name of the document from which each index image originates, wherein each index image occurs at least once in each of its corresponding documents;
   displaying along with each of the index images and the document names, a document type, and a user associated with each of the documents; and responsive to user selection of at least one index image displayed in the user interface, retrieving all documents associated with the selected index image, wherein the scanned documents have been indexed according to the following:

for each document to be stored in the repository, dividing the document into a plurality of sections;

scanning the plurality of sections;

segmenting each scanned section according to a predetermined coding model into image segments and non-image segments;

associating each of the image segments with the document;

generating an index correlating the image segments with the document;

defining the correlated image segments as index images; and storing additional information about the index image.

8. A method of retrieving a scanned document stored in a repository, comprising:

displaying in a user interface a preview of a plurality of index images and each name of the document from which each index image originates, wherein each index image occurs at least once in each of its corresponding documents;

displaying along with each of the index images and the document names, a document type, and a user associated with each of the documents; and responsive to user selection of at least one index image displayed in the user interface, retrieving all documents associated with the selected index image, wherein the scanned documents have been indexed according to the following:

for each document to be stored in the repository, scanning the document to obtain a grayscale image;

determining at least one region of interest in the grayscale image;

determining predetermined statistical characteristics of the at least one region of interest;

based on the statistical characteristics of the at least one region of interest, classifying the at least one region of interest as either text or non-text;

associating each of the non-text regions of interest with the document; and generating an index correlating the non-text regions of interest with the document.

* * * * *